(12) United States Patent
Nishimura

(10) Patent No.: US 11,087,384 B2
(45) Date of Patent: Aug. 10, 2021

(54) INFORMATION PROCESSING SYSTEM, STORAGE MEDIUM STORING PROGRAM, AND CONTROL METHOD

(71) Applicant: TOYOTA JIDOSHA KABUSHIKI KAISHA, Toyota (JP)

(72) Inventor: Kazuya Nishimura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 16/388,928

(22) Filed: Apr. 19, 2019

(65) Prior Publication Data
US 2020/0020021 A1   Jan. 16, 2020

(30) Foreign Application Priority Data

Jul. 11, 2018   (JP) .............................. JP2018-131436

(51) Int. Cl.
*G06Q 30/00* (2012.01)
*G06Q 30/06* (2012.01)
(Continued)

(52) U.S. Cl.
CPC ..... *G06Q 30/0635* (2013.01); *G01C 21/3407* (2013.01); *G05D 1/0088* (2013.01); *G05D 2201/0213* (2013.01)

(58) Field of Classification Search
CPC ............ G01C 21/3407; G01C 21/3605; G06Q 30/0635; G05D 1/0088; G05D 2201/0213
(Continued)

(56) References Cited

U.S. PATENT DOCUMENTS 10,049,393 B1 *   8/2018   Cearns ................ G06Q 30/0605
2003/0172042 A1 *   9/2003   Agui ..................... B60P 3/0257
705/500

(Continued)

FOREIGN PATENT DOCUMENTS

JP         2003-256517 A       9/2003

OTHER PUBLICATIONS

"A New Day for Home Delivery," Kay, Michael G. ISE ; Industrial and Systems Engineering at Work 48.8: 31-36. Institute of Industrial and Systems Engineers (IISE). (Aug. 2016).*

(Continued)

*Primary Examiner* — Robert M Pond
(74) *Attorney, Agent, or Firm* — Oliff PLC

(57) ABSTRACT

An information processing system including an information processing device that is used by a first user and a server configured that can communicate with the information processing device is provided. The server is configured to store a first list of commodities which are sold by the first user who uses a vehicle, a second list of commodities which a second user wants to purchase, and position information of a receiving place of the commodities. The information processing device is configured to notify the first user of transaction information when a predetermined condition based on position information or travel route information of the vehicle which is moving and the position information of the receiving place is satisfied. The transaction information is information including identification information of commodities which are common to the first list and the second list and the position information of the receiving place.

11 Claims, 7 Drawing Sheets

(51) Int. Cl.
 *G05D 1/00* (2006.01)
 *G01C 21/34* (2006.01)

(58) Field of Classification Search
 USPC .................................................. 705/26, 27
 See application file for complete search history.

(56) References Cited

U.S. PATENT DOCUMENTS

| | | | |
|---|---|---|---|
| 2015/0106229 A1* | 4/2015 | Lyman | G06Q 30/0639 705/26.9 |
| 2016/0027096 A1* | 1/2016 | Li | G06Q 30/0277 705/26.81 |
| 2018/0118078 A1* | 5/2018 | Alkhaldi | B60P 3/0257 |
| 2018/0297781 A1* | 10/2018 | Alkhaldi | G06Q 10/087 |
| 2018/0349872 A1* | 12/2018 | Ahmed | G06Q 20/0855 |
| 2019/0019143 A1* | 1/2019 | Cantrell | G05D 1/104 |
| 2019/0043001 A1* | 2/2019 | Woulfe | G06Q 10/083 |
| 2019/0285424 A1* | 9/2019 | Imai | G01C 21/3438 |

OTHER PUBLICATIONS

"Are Drone Deliveries And Robotic Gofers Ready To Serve You?" Seitz, Patrick. Investor's Business Daily [Los Angeles] Jun. 9, 2017.*

"Final mile is often the final straw for UK consumers according to new research from eDelivery EXPO; British Public Still Prefer the Human Touch Rather than Autonomous Methods to Deliver Good," M2 Presswire [Coventry] Feb. 27, 2018.*

"For Retailers, Unmanned Systems Are Big Business." Anonymous. Dealerscope 59.5: 32. North American Publishing Company North American Publishing Company d/b/a NAPCO Media. (May 2017).*

\* cited by examiner

FIG. 5

| IDENTIFICATION INFORMATION OF FIRST USER | FIRST LIST ||
|---|---|---|
| | IDENTIFICATION OF COMMODITES | DESIRED SELLING PRICE |
| U001 | CLOTHING A | 1000 yen |
| | CLOTHING B | 1500 yen |
| | BOOK C | 7280 yen |
| | BOOK D | 800 yen |

FIG. 6

| IDENTIFICATION INFORMATION OF SECOND USER | SECOND LIST ||
|---|---|---|
| | IDENTIFICATION OF COMMODITES | DESIRED PURCHASE PRICE |
| U002 | CLOTHING A | 4000 yen |
| | BOOK C | 5000 yen |
| | TOY E | 2980 yen |

FIG. 7

| IDENTIFICATION INFORMATION OF SECOND USER | RECEIPT INFORMATION |||
|---|---|---|---|
| | POSITION INFORMATION OF RECEIVING PLACE | RECEIVING METHOD | RECEIVABLE TIME PERIOD |
| U002 | POSITION P | DIRECTLY | 10:00~16:00 |

INFORMATION PROCESSING SYSTEM, STORAGE MEDIUM STORING PROGRAM, AND CONTROL METHOD

CROSS-REFERENCE TO RELATED APPLICATIONS

This application claims priority to Japanese Patent Application No. 2018-131436 filed on Jul. 11, 2018, which is incorporated herein by reference in its entirety.

BACKGROUND

1. Technical Field

The disclosure relates to an information processing system, a storage medium storing a program, and a control method.

2. Description of Related Art

A technique associated with transportation and sale of commodities using a vehicle is known in the related art. For example, Japanese Unexamined Patent Application Publication No. 2003-256517 (JP 2003-256517 A) discloses a mobile sales system in which when a mobile sales vehicle arrives at the vicinity of a sales territory, an onboard communication terminal calls a registered communication terminal in the sales territory, transmits sales information thereto, and receives ordering information in response to the sales information.

SUMMARY

Recently, sale of commodities by private persons instead of companies has spread widely in society. However, with the spread of sale of commodities by private persons, since use of vehicles for only the purpose of transportation of commodities by private persons increases, for example, disadvantages such as an increase in energy consumption in the overall society may occur. As for purchasers of commodities, disadvantages that delivery fees based on use of vehicles for only the purpose of transportation of commodities are caused may occur. Accordingly, there is room for improvement in the technique for transportation and sale of commodities using a vehicle.

The disclosure provides an information processing system that can improve a technique for transportation and sale of commodities using a vehicle.

According to a first aspect of the disclosure, there is provided an information processing system including an information processing device and a server. The information processing device is configured to be used by a first user. The server is configured to communicate with the information processing device. The server is configured to store a first list of commodities which are sold by the first user who uses a vehicle, a second list of commodities which a second user wants to purchase, and position information of a receiving place of the commodities. The information processing device is configured to notify the first user of transaction information when a predetermined condition based on position information or travel route information of the vehicle which is moving and the position information of the receiving place is satisfied. The transaction information is information including identification information of commodities which are common to the first list and the second list and the position information of the receiving place.

In the information processing system according to the first aspect, the information processing device may be a navigation device.

In the information processing system according to the first aspect, the information processing device may be an automatic driving control device.

In the information processing system according to the first aspect, the server may be configured: (i) to store the position information or the travel route information of the vehicle which is moving; (ii) determine whether the predetermined condition is satisfied; (iii) determine whether there is a commodity that is common to the first list and the second list when it is determined that the predetermined condition is satisfied; and (iv) transmit the transaction information to the information processing device when it is determined that there is a commodity that is common.

In the information processing system according to the first aspect, the information processing device may be configured to execute driving support with the receiving place as a destination in response to a predetermined user input after notifying the first user of the transaction information.

In the information processing system according to the first aspect, the first list may further include desired selling prices of the commodities which are sold by the first user. The second list may further include desired purchase prices of the commodities which the second user wants to purchase. The information processing device may be configured to notify the first user of the transaction information including identification information of commodities which are common to the first list and the second list and of which the desired selling prices are equal to or less than the desired purchase prices when the predetermined condition is satisfied.

In the information processing system according to the first aspect, the first list may further include commodity statuses indicating whether each commodity which is sold by the first user is a new article or a secondhand article. The second list may further include commodity statuses indicating whether each commodity which the second user wants to purchase is a new article or a secondhand article.

In the information processing system according to the first aspect, the predetermined condition may include a first condition that a distance or a temporal distance from a position or a travel route of the vehicle to the receiving place is less than a reference value.

In the information processing system according to the first aspect, the server may be configured to further store a time period in which receiving is possible in the receiving place. The predetermined condition may be calculated based on the position information or the travel route information of the vehicle and the position information of the receiving place. The predetermined condition may further include a second condition that a predicted time at which the vehicle will arrive at the receiving place is included in the time period in which receiving is possible.

According to a second aspect of the disclosure, there is provided a computer-readable storage medium storing a program that causes an information processing device which is used by a first user, to execute processes. The processes include: (i) communicating with a server configured to store a first list of commodities which are sold by the first user who uses a vehicle, a second list of commodities which a second user wants to purchase, and position information of a receiving place of the commodities; and (ii) notifying the first user of transaction information when a predetermined condition based on position information or travel route information of the vehicle which is moving and the position information of the receiving place is satisfied, the transaction information being information including identification information of commodities which are common to the first list and the second list and the position information of the receiving place.

According to a third aspect of the disclosure, there is provided a control method for an information processing device which is used by a first user. The control method includes: (i) communicating with a server configured to store a first list of commodities which are sold by the first user who uses a vehicle, a second list of commodities which a second user wants to purchase, and position information of a receiving place of the commodities; and (ii) notifying the first user of transaction information when a predetermined condition based on position information or travel route information of the vehicle which is moving and the position information of the receiving place is satisfied, the transaction information being information including identification information of commodities which are common to the first list and the second list and the position information of the receiving place.

With the information processing system according to the first aspect of the disclosure, the program according to the second aspect, and the control method according to the third aspect, it is possible to improve a technique for transportation and sale of commodities using a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram illustrating an example of a first list which is stored in the server;

FIG. 6 is a diagram illustrating an example of a second list which is stored in the server;

FIG. 7 is a diagram illustrating an example of receipt information which is stored in the server;

DESCRIPTION OF EMBODIMENTS

Hereinafter, embodiments of the disclosure will be described.

Figure 1:
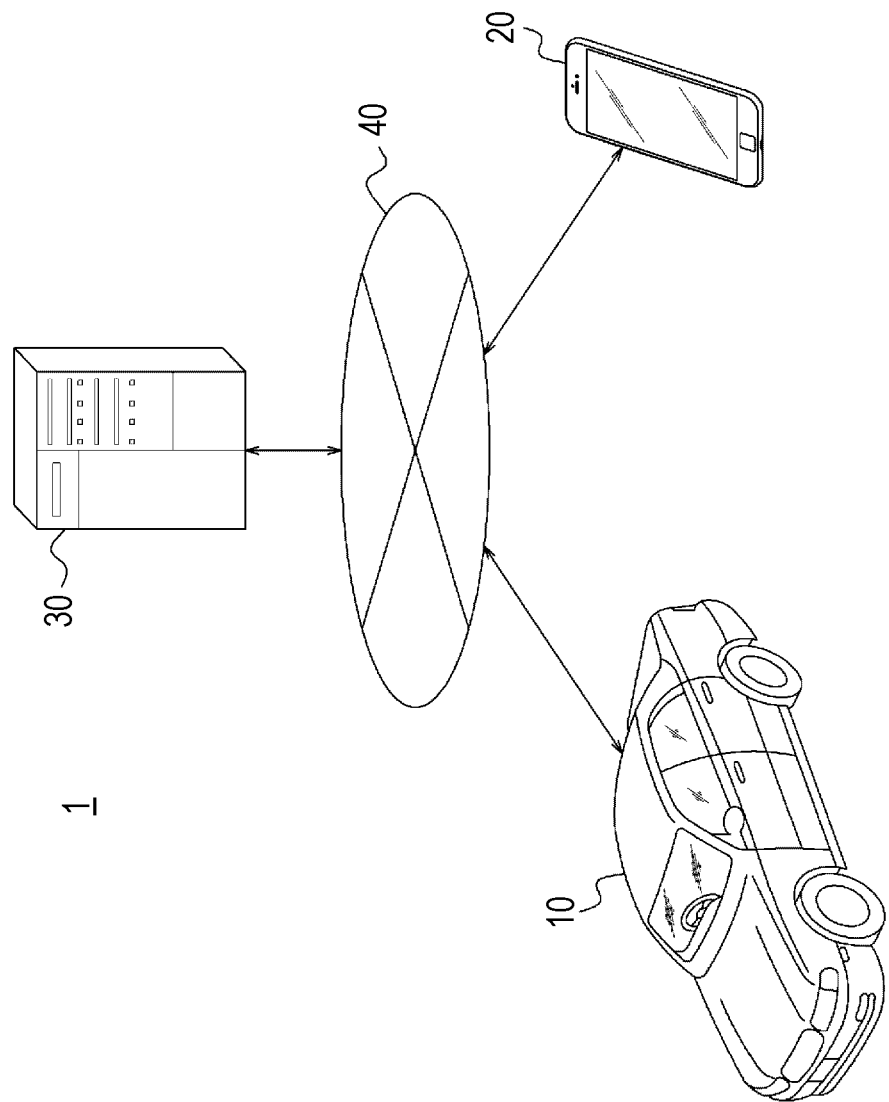
FIG. 1 is a diagram schematically illustrating a configuration of an information processing system according to an embodiment of the disclosure.

A configuration of an information processing system will be described below. An outline of an information processing system 1 according to an embodiment of the disclosure will be described with reference to FIG. 1. The information processing system 1 includes a vehicle 10, a terminal device 20, and a server 30. The vehicle 10 is, for example, an automobile, but is not limited thereto and may be an arbitrary vehicle. The terminal device 20 is a general-purpose electronic device such as a smartphone or a personal computer (PC), but is not limited thereto and may be an electronic device dedicated for the information processing system 1. In FIG. 1, one vehicle 10 and one terminal device 20 are illustrated for the purpose of convenience of description, but the number of vehicles 10 and the number of terminal devices 20 which are included in the information processing system 1 can be equal to or greater than one. The server 30 includes one server device or a plurality of server devices that can communicate with each other. The vehicle 10, the terminal device 20, and the server 30 are communicatively connected to, for example, a network 40 including a mobile communication network and the Internet.

As an outline of this embodiment, a first user who uses the vehicle 10 loads commodities to be sold into the vehicle 10 and uploads a first list of commodities which have been loaded to the server 30. A second user who uses the terminal device 20 uploads a second list of commodities which the second user wants to purchase and position information of a receiving place of commodities to the server 30. The first user starts movement using the vehicle 10 in which commodities are loaded. The vehicle 10 transmits position information thereof to the server 30 during movement. For example, when the vehicle 10 approaches the receiving place of the second user, the server 30 transmits transaction information indicating commodities which are common to the first list and the second list, transaction prices of the commodities, the receiving place, and the like to the vehicle 10. The vehicle 10 notifies the first user of the transaction information, and executes driving support with the receiving place as a destination in response to a user input for accepting the transaction. The first user who has arrived at the receiving place sells the commodities indicated by the transaction information to the second user. In this embodiment, payment of a purchase price corresponding to transaction prices of the commodities is performed by electronic payment via the server 30, but may be performed, directly between the first user and the second user.

In this way, according to this embodiment, the first user starts movement using the vehicle 10 and then is first notified of the presence of the second user, for example, when the vehicle 10 approaches the receiving place of the second user who wants to purchase commodities. With this configuration, when the first user is using the vehicle 10 for the purpose other than transportation and sale of commodities, the first user can sell commodities with so-called "stopping on the way." Accordingly, use of the vehicle 10 for only the purpose of transportation and sale of commodities by the first user can be reduced and disadvantages such as an increase in energy consumption in the overall society can be reduced. As a result, it is possible to improve a technique for transportation and sale of commodities using the vehicle 10.

Figure 2:
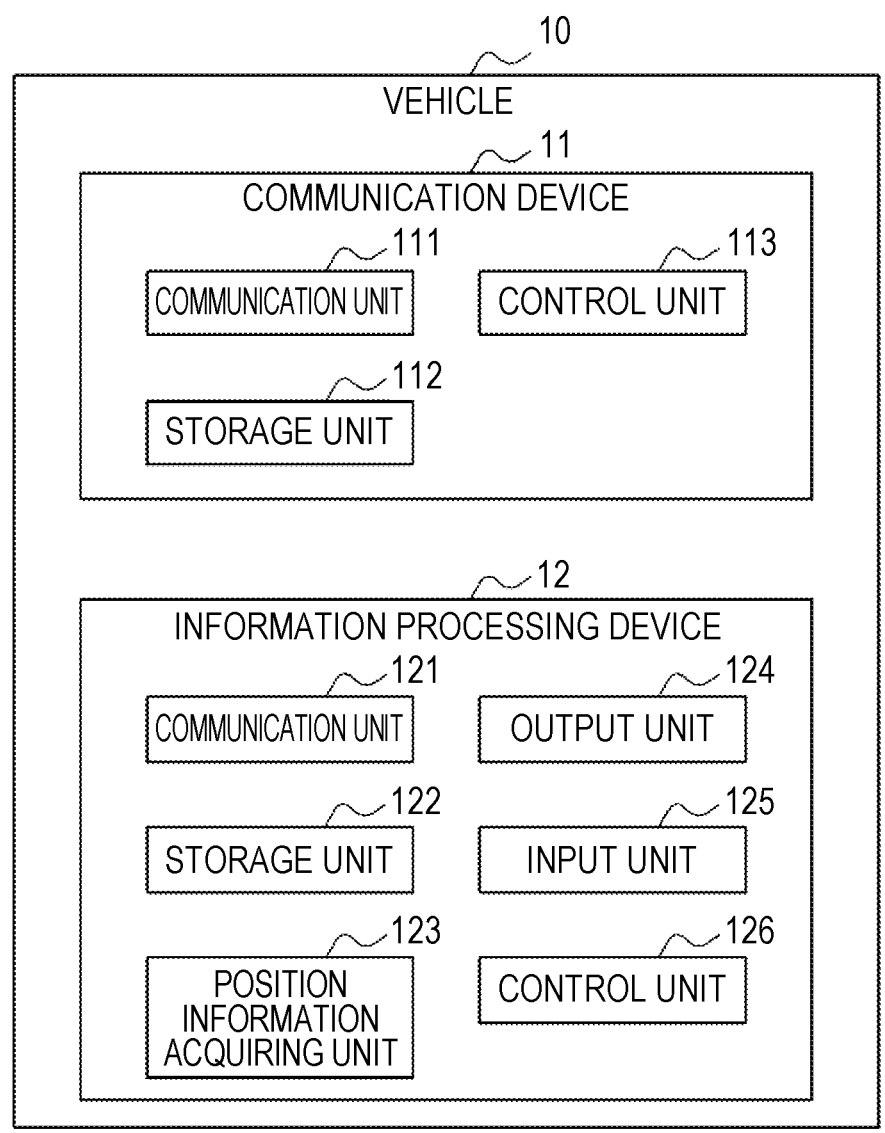
FIG. 2 is a block diagram schematically illustrating a configuration of a vehicle illustrated in FIG. 1.

Elements of the information processing system 1 will be described below in detail. First, the configuration of the vehicle will be described. As illustrated in FIG. 2, the vehicle 10 includes a communication device 11, and an information processing device 12. The communication device 11 and the information processing device 12 are connected to communicate with each other via an onboard network or a dedicated line such as a controller area network (CAN).

The communication device 11 is an onboard communication device such as a data communication module (DCM).

Specifically, the communication device 11 includes a communication unit 111, a storage unit 112, and a control unit 113.

The communication unit 111 includes a communication module that performs communication via an onboard network or a dedicated line. The communication unit 111 includes a communication module that is connected to the network 40. For example, the communication unit 111 may include a communication module corresponding to a mobile communication standard such as $4^{th}$ generation (4G) and 5-th generation (5G). In this embodiment, the vehicle 10 is connected to the network 40 via the communication unit 111.

The storage unit 112 includes one or more memories. In this embodiment, a "memory" is, for example, a semiconductor memory, a magnetic memory, or an optical memory but is not limited thereto. Each memory included in the storage unit 112 may serve as, for example, a main storage device, an auxiliary storage device, or a cache storage device. The storage unit 112 stores arbitrary information which is used for operation of the communication device 11. For example, the storage unit 112 may store a system program, an application program, identification information of the first user who uses the vehicle 10, and identification information of the vehicle 10. The identification information of the first user and the vehicle 10 is information for uniquely identifying the first user and the vehicle 10 in the information processing system 1. When information is transmitted from the communication device 11 to the server 30, the identification information of the first user and the vehicle 10 along with the information is transmitted to the server 30 and thus the server 30 can identify the first user and the vehicle 10 as a transmission source. Here, identification information of the communication device 11 or the information processing device 12 in the vehicle 10 may be used as the identification information of the vehicle 10. Information stored in the storage unit 112 may be updated with, for example, information which is acquired from the network 40 via the communication unit 111.

The control unit 113 includes one or more processors. In this embodiment, a "processor" is a general-purpose processor or a dedicated processor specialized to a specific process, but is not limited thereto. The control unit 113 controls the overall operation of the communication device 11. In this embodiment, the vehicle 10 and the server 30 communicate with each other via the communication device 11 which is controlled by the control unit 113.

The information processing device 12 is a device that executes driving support of the vehicle 10. Driving support is, for example, travel route guidance or automatic driving to a destination, but is not limited thereto. For example, automatic driving includes Levels 1 to 5 which are defined in the Society of Automotive Engineers (SAE), but is not limited thereto and may be defined arbitrarily. Driving support may be executed, for example, by cooperation between the information processing device 12 and an electronic control unit (ECU) of the vehicle 10. The information processing device 12 is, for example, a navigation device or an automatic driving control device that is mounted in the vehicle 10, but is not limited thereto. Specifically, the information processing device 12 includes a communication unit 121, a storage unit 122, a position information acquiring unit 123, an output unit 124, an input unit 125, and a control unit 126.

The communication unit 121 includes a communication module that performs communication via an onboard network or a dedicated line.

The storage unit 122 includes one or more memories. Each memory included in the storage unit 122 may serve as, for example, a main storage device, an auxiliary storage device, or a cache storage device. The storage unit 122 stores arbitrary information which is used for operation of the information processing device 12. For example, the storage unit 122 may store a system program, an application program, road traffic information, and road map information. Information stored in the storage unit 122 may be updated with, for example, information which is acquired from the network 40 via the communication device 11.

The position information acquiring unit 123 includes one or more receivers corresponding to an arbitrary satellite positioning system. For example, the position information acquiring unit 123 may include a global positioning system (GPS) receiver. The position information acquiring unit 123 acquires position information of the vehicle 10.

The output unit 124 includes one or more output interfaces that output information to perform user notification. For example, each output interface included in the output unit 124 is a display that outputs information as an image or a speaker that outputs information as sound, but is not limited thereto. For example, a display is a panel display or a head-up display, but is not limited thereto. In this embodiment, an "image" may include text, a still image, and a moving image.

The input unit 125 includes one or more input interfaces that detect a user input. For example, each input interface included in the input unit 125 is a physical key, a capacitive key, a touch screen that is provided integrally with a panel display of the output unit 124, or a microphone that receives a sound input, but is not limited thereto.

The control unit 126 includes one or more processors. The control unit 126 controls the overall operation of the information processing device 12.

For example, the control unit 126 receives a user input of a first list of commodities which are sold by a first user who uses the vehicle 10 and stores the first list in the storage unit 122. In this embodiment, the "first list" includes identification information and desired selling prices of the commodities. Identification information of a commodity includes, for example, a name and a model number of the commodity, but is not limited thereto and may be arbitrary information for enabling a user to identify the commodity. The desired selling price is a selling price at which the first user wants to sell the corresponding commodity. The desired selling price can be freely set by the first user and may be, for example, zero. The control unit 126 transmits the first list to the server 30 via the communication device 11. When the first user starts movement using the vehicle 10, the first user can load the commodities included in the first list into the vehicle 10 in advance.

The control unit 126 executes driving support with a designated place as a destination based on a user input for designating an arbitrary place. Specifically, the control unit 126 determines a travel route to the designated destination, and executes travel route guidance based on the travel route or executes automatic driving of the vehicle 10 along the travel route. For example, when the vehicle 10 deviates from the travel route, the control unit 126 may correct the travel route during movement of the vehicle 10 responsively. Determination and correction of the travel route are performed, for example, using road traffic information and road map information stored in the storage unit 122.

The control unit 126 transmits position information or travel route information of the vehicle 10 during movement to the server 30 via the communication device 11. Transmission of position information or travel route information may be performed, for example, periodically or whenever the vehicle 10 is in a predetermined state (for example, a stopped state).

The control unit 126 can receive transaction information of commodities from the server 30 via the communication device 11. Details of transaction information will be described later. The control unit 126 outputs the transaction information via the output unit 124 as an image or voice to notify the first user and prompts the first user to determine whether a transaction is to be accepted. Here, the control unit 126 may notify the first user of a message for prompting the first user to input whether a transaction is to be accepted along with the transaction information.

When a user input indicating acceptance of the transaction is detected, the control unit 126 transmits an acceptance notification of the transaction to the server 30 via the communication device 11. The acceptance notification includes a predicted time at which the vehicle 10 arrives at a receiving place along the travel route with the receiving place indicated by the transaction information as a destination as will be described later. The control unit 126 executes driving support with the receiving place indicated by the transaction information as a destination. When the first user arrives as the receiving place, the first user delivers a commodity indicated by the transaction information. The delivery of a commodity may be performed directly from the first user to the second user at the receiving place or may be performed by causing the first user to put the commodity into a space such as a home delivery box installed at the receiving place. The control unit 126 waits until completion of the delivery of a commodity is detected. In this embodiment, the control unit 126 determines that the completion of delivery of a commodity is detected, for example, in response to a user input indicating that the delivery of a commodity has been completed. However, the detection of the completion of delivery of a commodity is not limited to this example, and can employ an arbitrary method. When the completion of delivery of a commodity is detected, the control unit 126 transmits a completion notification of the transaction to the server 30 via the communication device 11.

On the other hand, when a user input indicating that the transaction is to be rejected is detected or when a predetermined time elapses after the transaction information has been received, the control unit 126 transmits a rejection notification of the transaction to the server 30 via the communication device 11.

Figure 3:
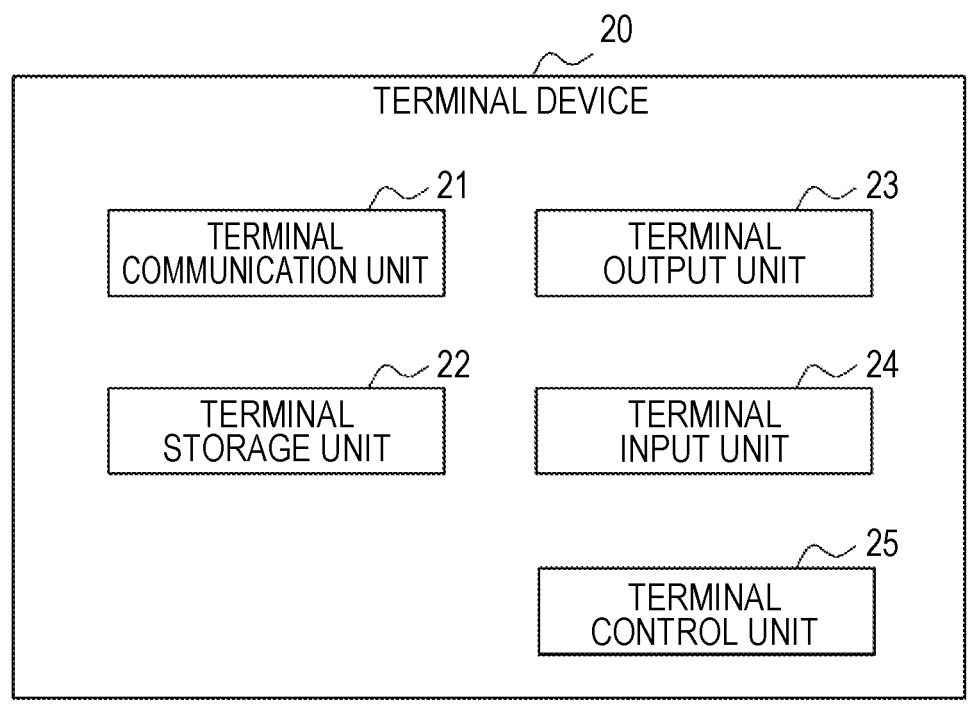
FIG. 3 is a block diagram schematically illustrating a configuration of a terminal device illustrated in FIG. 1.

The configuration of a terminal device will be described below. As illustrated in FIG. 3, the terminal device 20 includes a terminal communication unit 21, a terminal storage unit 22, a terminal output unit 23, a terminal input unit 24, and a terminal control unit 25.

The terminal communication unit 21 includes a communication module that is connected to the network 40. For example, the terminal communication unit 21 may include a communication module corresponding to a mobile communication standard such as 4G and 5G. In this embodiment, the terminal device 20 is connected to the network 40 via the terminal communication unit 21.

The terminal storage unit 22 includes one or more memories. Each memory included in the terminal storage unit 22 may serve as, for example, a main storage device, an auxiliary storage device, or a cache storage device. The terminal storage unit 22 stores arbitrary information which is used for operation of the terminal device 20. For example, the terminal storage unit 22 may store a system program, an application program, and identification information of the second user who uses the terminal device 20. Information stored in the terminal storage unit 22 may be updated with, for example, information which is acquired from the network 40 via the terminal communication unit 21.

The terminal output unit 23 includes one or more output interfaces that output information to perform user notification. For example, each output interface included in the terminal output unit 23 is a display that outputs information as an image or a speaker that outputs information as sound, but is not limited thereto.

The terminal input unit 24 includes one or more input interfaces that detect a user input. For example, each input interface included in the terminal input unit 24 is a physical key, a capacitive key, a touch screen that is provided integrally with the display of the terminal output unit 23, or a microphone that receives a sound input, but is not limited thereto.

The terminal control unit 25 includes one or more processors. The terminal control unit 25 controls the overall operation of the terminal device 20.

For example, the terminal control unit 25 receives a user input of a second list of commodities which the second user who uses the terminal device 20 wants to purchase and receipt information on receipt of the commodity and stores the second list and the receipt information in the terminal storage unit 22. In this embodiment, the "second list" includes identification information and desired purchase prices of the commodities. A desired purchase price is a purchase price at which the second user wants to purchase the corresponding commodity. The desired purchase price can be freely set by the second user and may be, for example, zero. In this embodiment, "receipt information" includes position information of a receiving place, a receiving method, and a time period of commodities in which receiving is possible. The position information of the receiving place includes information of a latitude and longitude or a location and may further include, for example, a name and an image of the receiving place. The terminal control unit 25 transmits the second list and the receipt information to the server 30 via the terminal communication unit 21.

The terminal control unit 25 waits until an agreement notification of the transaction is received from the server 30. Details of an agreement notification will be described later. When an agreement notification is received via the terminal communication unit 21, the terminal control unit 25 outputs the agreement notification as an image or a voice using the terminal output unit 23 to notify the second user and prompts the second user to receive the commodity from the first user. Receipt of the commodity may be performed directly from the first user by the second user at the receiving place or may be performed by causing the second user to take the commodity which has been put into a space such as a home delivery box installed at the receiving place.

After the second user has been notified of the agreement notification, the terminal control unit 25 waits until completion of receipt of the commodity is detected. In this embodiment, the terminal control unit 25 determines that the completion of receipt of the commodity has been detected, for example, in response to a user input indicating that receipt of the commodity has been completed. However, detection of the completion of receipt of the commodity is not limited to this example, and can employ an arbitrary method. When the completion of receipt of the commodity is detected, the terminal control unit 25 transmits a completion notification of the transaction to the server 30 via the terminal communication unit 21.

Figure 4:
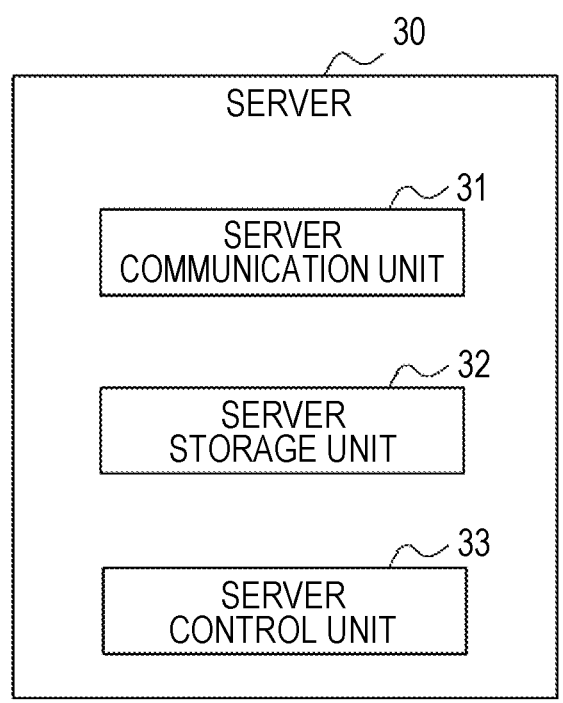
FIG. 4 is a block diagram schematically illustrating a configuration of a server illustrated in FIG. 1.

The configuration of a server will be described below. As illustrated in FIG. 4, the server 30 includes a server communication unit 31, a server storage unit 32, and a server control unit 33.

The server communication unit 31 includes a communication module that is connected to the network 40. For example, the server communication unit 31 may include a communication module corresponding to a wired local area network (LAN) standard. In this embodiment, the server 30 is connected to the network 40 via the server communication unit 31.

The server storage unit 32 includes one or more memories. Each memory included in the server storage unit 32 may serve as, for example, a main storage device, an auxiliary storage device, or a cache storage device. The server storage unit 32 stores arbitrary information which is used for operation of the server 30. For example, the server storage unit 32 may store a system program, an application program, road traffic information, and road map information. Information stored in the server storage unit 32 may be updated with, for example, information which is acquired from the network 40 via the server communication unit 31.

The server control unit 33 includes one or more processors. The server control unit 33 controls the overall operation of the server 30.

For example, the server control unit 33 receives the first list of commodities which are sold by the first user who uses the vehicle 10 from the information processing device 12 via the server communication unit 31 and stores the first list in the server storage unit 32. For example, as illustrated in FIG. 5, the first list is stored in correlation with the identification information of the first user. The first list illustrated in FIG. 5 includes identification information and desired selling prices of four commodities. Specifically, the first row in FIG. 5 denotes that the desired selling price of "clothing A" which is a commodity is "1000 yen." Similarly, the second to fourth rows denote that the desired selling prices of "clothing B," "book C," and "book D" which are commodities are "1500 yen," "7280 yen," and "800 yen," respectively.

The server control unit 33 receives the second list and the receipt information from the terminal device 20 via the server communication unit 31 and stores the second list and the receipt information in the server storage unit 32.

For example, as illustrated in FIG. 6, the second list is stored in correlation with the identification information of the second user who uses the terminal device 20. The second list illustrated in FIG. 6 includes identification information and desired purchase prices of three commodities. Specifically, the first row with "U002" which is the "identification information of the second user" in FIG. 6 denotes that the desired purchase price of "clothing A" which is a commodity is "4000 yen." Similarly, the second and third rows denote that the desired purchase prices of "book C" and "toy E" which are commodities are "5000 yen" and "2980 yen," respectively.

For example, as illustrated in FIG. 7, the receipt information is stored in correlation with the identification information of the second user who uses the terminal device 20. The receipt information illustrated in FIG. 7 includes position information of a receiving place, a receiving method, and a time period in which receiving is possible. Specifically, the receipt information illustrated in FIG. 7 indicates that a commodity can be received directly at position P from 10:00 to 16:00.

The server control unit 33 receives position information or travel route information of the vehicle 10 during movement from the information processing device 12 via the server communication unit 31 and stores the received position information or travel route information in the server storage unit 32. The server control unit 33 determines whether a predetermined condition based on the position information or travel route information of the vehicle 10 during movement and the position information of the receiving place included in the receipt information is satisfied. The predetermined condition includes a first condition that a distance or a temporal distance from the position or the travel route of the vehicle 10 to the receiving place is less than a reference value. The reference value may be determined arbitrarily. The distance or the temporal distance is calculated by the server control unit 33 using the position information or travel route information of the vehicle 10, the position information of the receiving place, and road traffic information and road map information stored in the server storage unit 32, but is not limited thereto and can be calculated using an arbitrary method. For example, when the vehicle 10 during movement approaches the receiving place or the travel route is determined or corrected to pass through the vicinity of the receiving place, it can be determined that the first condition has been satisfied.

Here, the predetermined condition is not limited to the above-mentioned example. For example, the predetermined condition may further include a second condition that a predicted time at which the vehicle 10 will arrive at the receiving place along the travel route with the receiving place as a destination is included in the time period in which receiving is possible and which is indicated by the receipt information. The predicted time is calculated by the server control unit 33 using the position information or travel route information of the vehicle 10, the position information of the receiving place, and road traffic information and road map information stored in the server storage unit 32, but is not limited thereto and can be calculated using an arbitrary method.

When it is determined that the predetermined condition has been satisfied, the server control unit 33 determines whether there are one or more commodities that are common to the first list of the first user and the second list of the second user. For example, in the examples illustrated in FIGS. 5 and 6, it is determined that there are two commodities, "clothing A" and "book C," common to the first list and the second list.

When it is determined that there are one or more commodities that are common to the first list and the second list, the server control unit 33 determines whether there are one or more commodities of which the desired selling price is equal to or lower than the desired purchase price among the one or more commodities. For example, in the examples illustrated in FIGS. 5 and 6, it is determined that there is a commodity "clothing A" of which the desired selling price "1000" is equal to or lower than the desired purchase price "4000."

The server control unit 33 transmits transaction information of the commodities which are common to the first list and the second list and of which the desired selling price is equal to or lower than the desired purchase price to the information processing device 12 via the server communication unit 31. In this embodiment, "transaction information" of a commodity includes identification information and a transaction price of the commodity which is a transaction target and the identification information and the receipt information (the position information of the receiving place, the receiving method, and the time period of the commodity in which receiving is possible) of the second user. The transaction price is, for example, the desired selling price, but is not limited thereto and may be determined arbitrarily within a range of the desired selling price or higher and the desired purchase price or lower. In the examples illustrated in FIGS. 5 to 7, transaction information including the identification information "clothing A" and the transaction price "1000" of the commodity which is common to the first list and the second list and of which the desired selling price is equal to or lower than the desired purchase price and the identification information "U002" and the receipt information (the position information "position P" of the receiving place, the receiving method "directly," and the time period of "10:00 to 16:00" in which receiving is possible) of the second user are transmitted to the information processing device 12. The transmitted transaction information is notified to the first user via the information processing device 12 as described above, and prompts the first user to determine whether the transaction is to be accepted.

When the acceptance notification has been received from the information processing device 12 after the transaction information has been transmitted, the server control unit 33 transmits an agreement notification of the transaction to the terminal device 20. In this embodiment, an "agreement notification" of a transaction includes the identification information, the transaction price, the position information of the receiving place, the receiving method of the commodity which is a transaction target, the predicted time at which the vehicle 10 will arrive at the receiving place, and the identification information of the first user. The predicted time included in the agreement notification is a predicted time (that is, a predicted time calculated by the information processing device 12) included in the agreement notification, but may be a predicted time calculated by the server control unit 33 as described above. The transmitted agreement notification is notified to the second user via the terminal device 20 as described above and prompts the second user to receive the commodity from the first user. Then, when a completion notification is received from at least one of the information processing device 12 and the terminal device 20, the server control unit 33 performs a payment process of a purchase price corresponding to the transaction price of the commodity. The payment process may be performed, for example, in cooperation with financial institutions which are used by the first user and the second user and the server 30. In this embodiment, the server control unit 33 performs the payment process when the completion notification has been received from both the information processing device 12 and the terminal device 20. When the payment process is completed, the transaction in which the commodity sold by the first user is purchased by the second user is completed.

Figure 8:
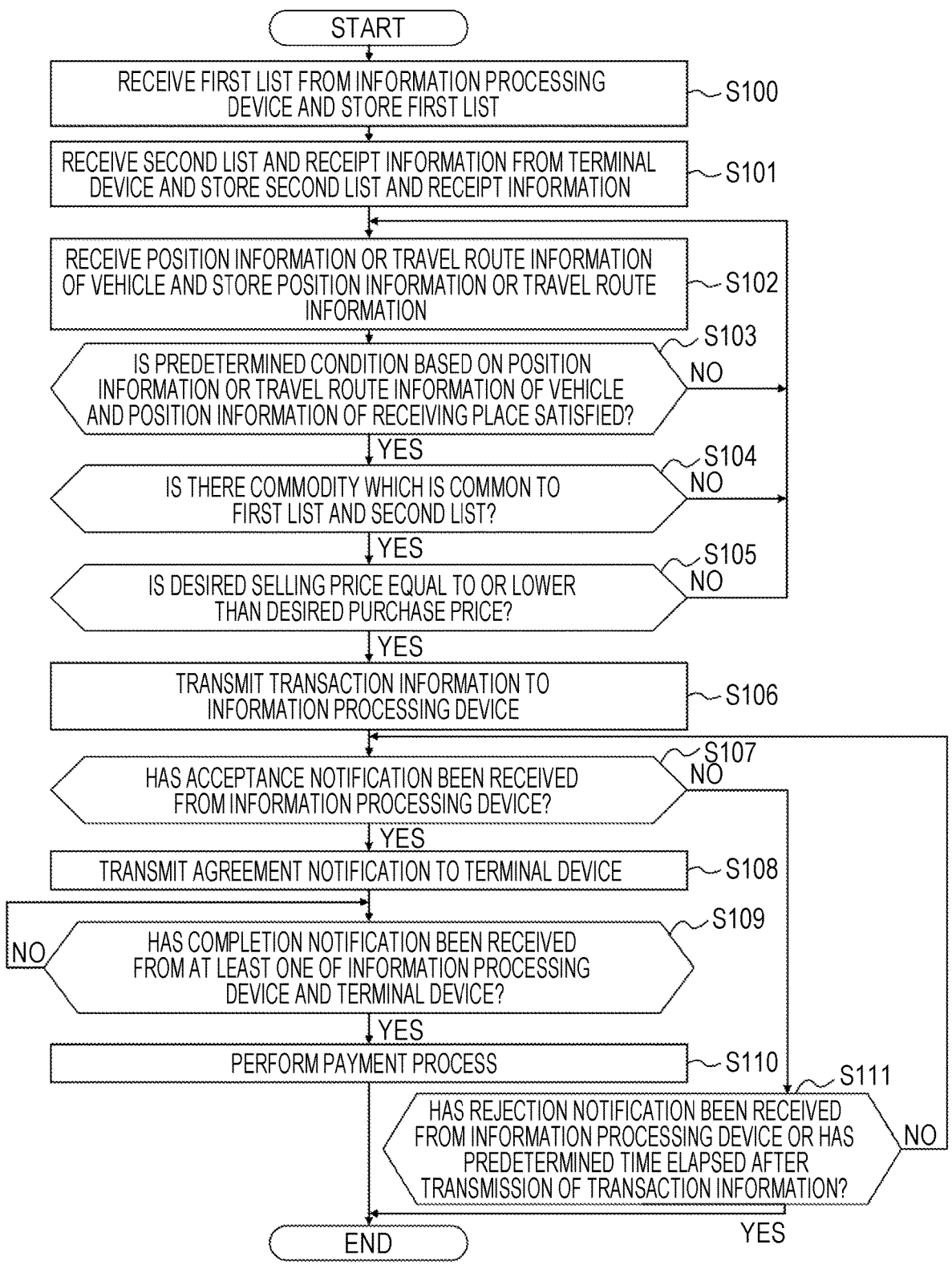
FIG. 8 is a flowchart illustrating an operation of the server.

The operation flow which is performed by the server 30 will be described below with reference to FIG. 8.

Step S100: The server control unit 33 receives a first list of commodities which are sold by a first user who uses the vehicle 10 from the information processing device 12 via the server communication unit 31 and stores the first list in the server storage unit 32. For example, as illustrated in FIG. 5, the first list is stored in correlation with the identification information of the first user.

Step S101: The server control unit 33 receives a second list and receipt information of commodities which a second user who uses the terminal device 20 wants to purchase from the terminal device 20 via the server communication unit 31 and stores the second list and the receipt information in the server storage unit 32. For example, as illustrated in FIGS. 6 and 7, the second list and the receipt information are stored in correlation with the identification information of the second user.

Step S102: The server control unit 33 receives position information or travel route information of the vehicle 10 during movement from the information processing device 12 via the server communication unit 31 and stores in the server storage unit 32.

Step S103: The server control unit 33 determines whether a predetermined condition based on the position information or travel route information of the vehicle 10 and position information of a receiving place included in the receipt information is satisfied. The predetermined condition includes a first condition that a distance or a temporal distance from the position or the travel route of the vehicle 10 to the receiving place is less than a reference value. The predetermined condition may further include a second condition that a predicted time at which the vehicle 10 will arrive at the receiving place along the travel route with the receiving place as a destination is included in a time period in which receiving is possible and which is indicated by the receipt information. When it is determined that the predetermined condition has been satisfied (YES in Step S103), the process flow transitions to Step S104. On the other hand, when it is determined that the predetermined condition has not been satisfied (NO in Step S103), the process flow returns to Step S102.

Step S104: The server control unit 33 determines whether there are one or more commodities that are common to the first list and the second list. When it is determined there are one or more commodities that are common to the first list and the second list (YES in Step S104), the process flow transitions to Step S105. On the other hand, when it is determined that there is no commodity that is common to the first list and the second list (NO in Step S104), the process flow returns to Step S102.

Step S105: The server control unit 33 determines whether there are one or more commodities in which the desired selling price indicated in the first list is equal to or lower than the desired purchase price indicated in the second list among the one or more commodities that are common to the first list and the second list. When it is determined that there are one or more commodities in which the desired selling price is equal to or lower than the desired purchase price (YES in Step S105), the process flow transitions to Step S106. On the other hand, when it is determined there is no commodity in which the desired selling price is equal to or lower than the desired purchase price (NO in Step S105), the process flow returns to Step S102.

Step S106: The server control unit 33 transmits transaction information of each commodity that is common to the first list and the second list and in which the desired selling price is equal to or lower than the desired purchase price to the information processing device 12 via the server communication unit 31. The transmitted transaction information is notified to the first user via the information processing device 12 as described above and prompts the first user to determine whether the transaction is to be accepted.

Step S107: The server control unit 33 determines whether an acceptance notification of the transaction has been received from the information processing device 12. When it is determined that an acceptance notification has been received (YES in Step S107), the process flow transitions to Step S108. On the other hand, when it is determined that an acceptance notification has not been received (NO in Step S107), the process flow transitions to Step S111.

Step S108: The server control unit 33 transmits an agreement notification of the transaction to the terminal device 20. The transmitted agreement notification is notified to the second user via the terminal device 20 as described above. Then, the server control unit 33 prompts the second user to receive the commodity from the first user.

Step S109: The server control unit 33 determines whether a completion notification has been received from at least one of the information processing device 12 and the terminal device 20. In this embodiment, the server control unit 33 determines whether a completion notification has been received from both the information processing device 12 and the terminal device 20. When it is determined that a completion notification has been received (YES in Step S109), the process flow transitions to Step S110. On the other hand, when it is determined that a completion notification has not been received (NO in Step S109), the process flow repeats Step S109.

Step S110: The server control unit 33 performs a payment process of a purchase price corresponding to the transaction prices of the commodities. Then, the process flow ends.

Step S111: The server control unit 33 determines whether a rejection notification has been received from the information processing device 12 or whether a predetermined time has elapsed after transmission of the transaction information in Step S106. When it is determined that a rejection notification has been received or the predetermined has elapsed (YES in Step S111), the process flow ends. On the other hand, when it is determined that a rejection notification has not been received and the predetermined time has not elapsed (NO in Step S111), the process flow returns to Step S107.

Figure 9:
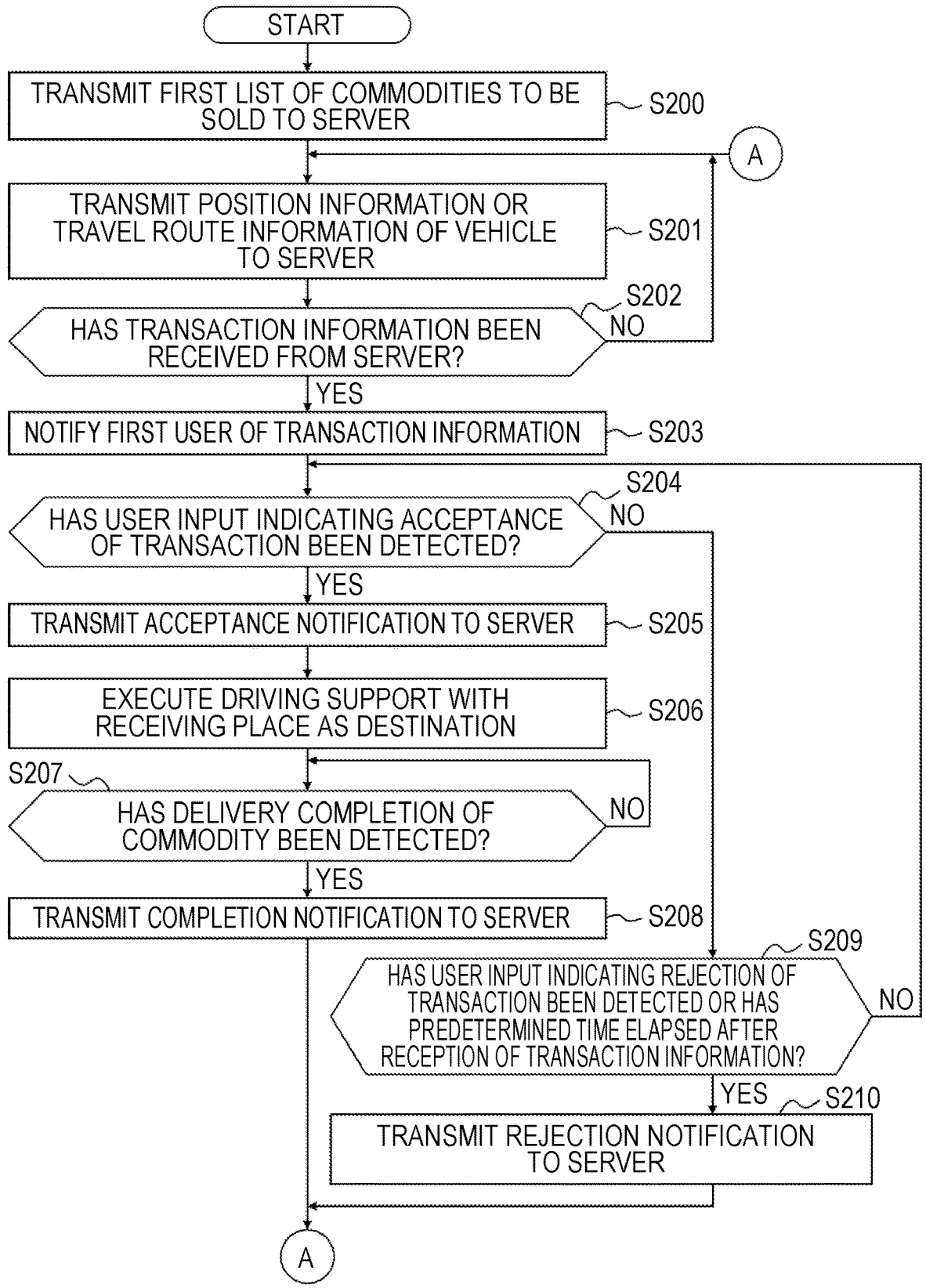
FIG. 9 is a flowchart illustrating an operation of an information processing device which is provided in the vehicle.

An operation flow of the information processing device 12 will be described below with reference to FIG. 9.

Step S200: The control unit 126 transmits a first list of commodities which are sold by a first user who uses the vehicle 10 to the server 30 via the communication device 11.

Step S201: The control unit 126 transmits position information or travel route information of the vehicle 10 during movement to the server 30 via the communication device 11.

Step S202: The control unit 126 determines whether transaction information of a commodity has been received from the server 30 via the communication device 11. When it is determined that transaction information has been received (YES in Step S202), the process flow transitions to Step S203. On the other hand, when it is determined that transaction information has not been received (NO in Step S202), the process flow returns to Step S201.

Step S203: The control unit 126 outputs the transaction information as an image or voice using the output unit 124 to notify the first user and prompts the first user to determine whether the transaction is to be accepted. Here, the control unit 126 may notify the first user of a message for prompting the first user to perform a user input indicating whether the transaction is to be accepted or the like.

Step S204: The control unit 126 determines whether a user input indicating that the transaction is to be accepted has been detected. When it is determined that the user input has been detected (YES in Step S204), the process flow transitions to Step S205. On the other hand, when it is determined that the user input has not been detected (NO in Step S204), the process flow transitions to Step S209.

Step S205: The control unit 126 transmits an agreement notification of the transaction to the server 30 via the communication device 11.

Step S206: The control unit 126 executes driving support with a receiving place indicated by the transaction information as a destination. When the first user arrives at the receiving place, the first user delivers the commodity indicated by the transaction information.

Step S207: The control unit 126 determines whether completion of delivery of the commodity has been detected. In this embodiment, the control unit 126 determines that completion of delivery of the commodity has been detected, for example, in response to the user input indicating that completion of delivery of the commodity has been detected. When it is determined that completion of delivery of the commodity has been detected (YES in Step S207), the process flow transitions to Step S208. On the other hand, when it is determined that completion of delivery of the commodity has not been detected (NO in Step S207), the process flow repeats Step S207.

Step S208: The control unit 126 transmits a completion notification of the transaction to the server 30 via the communication device 11. Thereafter, the process flow returns to Step S201.

Step S209: The control unit 126 determines whether a user input indicating that the transaction is to be rejected has been detected or whether a predetermined has elapsed after reception of the transaction information. When it is determined that the user input has been detected or the predetermined time has elapsed (YES in Step S209), the process flow transitions to Step S210. On the other hand, when it is determined that the user input has not been detected and the predetermined time has not elapsed (NO in Step S209), the process flow returns to Step S204.

Step S210: The control unit 126 transmits a rejection notification of the transaction to the server 30 via the communication device 11. Thereafter, the process flow returns to Step S201.

Figure 10:
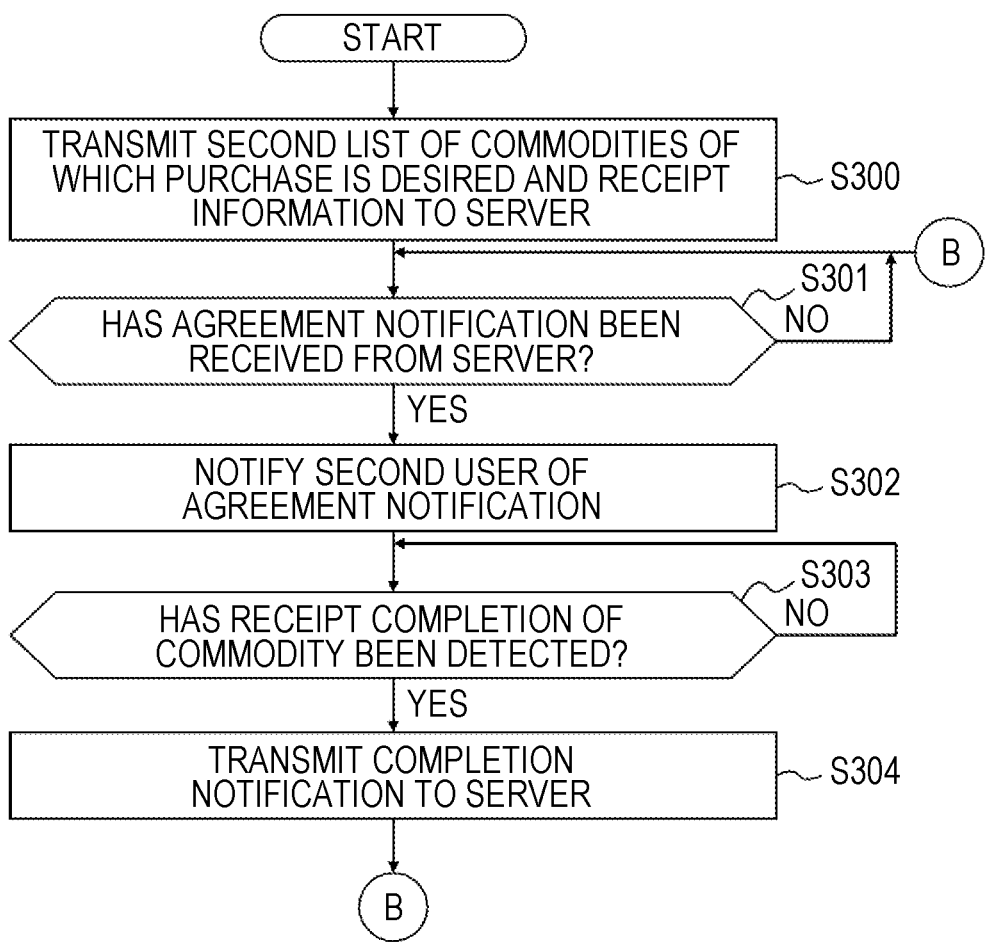
FIG. 10 is a flowchart illustrating an operation of the terminal device.

An operation flow of the terminal device 20 will be described below with reference to FIG. 10.

Step S300: The terminal control unit 25 transmits a second list of commodities which a second user who uses the terminal device 20 wants to purchase and receipt information on receipt of a commodity to the server 30 via the terminal communication unit 21.

Step S301: The terminal control unit 25 determines whether an agreement notification of a transaction has been received from the server 30 via the terminal communication unit 21. When it is determined that an agreement notification has been received (YES in Step S301), the process flow transitions to Step S302. On the other hand, when it is determined that an agreement notification has not been received (NO in Step S301), the process flow repeats Step S301.

Step S302: The terminal control unit 25 outputs the agreement notification as an image or voice using the terminal output unit 23 to notify the second user and prompts the second user to receive the corresponding commodity from the first user.

Step S303: The terminal control unit 25 determines whether completion of receipt of the commodity has been detected. In this embodiment, the terminal control unit 25 determines that completion of receipt of the commodity has been detected, for example, in response to a user input indicating that receipt of the commodity has been completed. When it is determined that completion of receipt of the commodity has been detected (YES Step S303), the process flow transitions to Step S304. On the other hand, when it is determined that completion of receipt of the commodity has not been detected (NO in Step S303), the process flow repeats Step S303.

Step S304: The terminal control unit 25 transmits a completion notification of the transaction to the server 30 via the terminal communication unit 21. Thereafter, the process flow returns to Step S301.

As described above, in the information processing system 1 according to this embodiment, the server 30 stores receipt information including a first list of commodities which are sold by a first user who uses the vehicle 10, a second list of commodities which a second user wants to purchase, and position information of a receiving place. When a predetermined condition based on position information or travel route information of the vehicle 10 and the position information of the receiving place is satisfied, the information processing device 12 that communicates with the server 30 notifies the first user of transaction information including identification information of a commodity which is common to the first list and the second list and the position information of the receiving place.

In this way, the first user starts movement using the vehicle 10 and then is first notified of presence of the second user who wants to purchase a commodity when the predetermined condition has been satisfied. With this configuration, when the first user is using the vehicle 10 for the purpose other than transportation and sale of commodities, the first user can sell commodities with so-called "stopping on the way". Accordingly, use of the vehicle 10 for only the purpose of transportation and sale of commodities by the first user can be reduced and disadvantages such as an increase in energy consumption in the overall society can be reduced. As a result, it is possible to improve a technique for transportation and sale of commodities using the vehicle 10.

While an embodiment of the disclosure has been described above with reference to the drawings, those skilled in the art should note that the disclosure can be modified or corrected in various forms based on this disclosure. Accordingly, it should be noted that the modifications and corrections are included in the scope of the disclosure. For example, the functions included in the devices or the steps can be rearranged without logical inconsistency and a plurality of devices or steps may be combined into one device or step or may be divided.

For example, in the above-mentioned embodiment, the communication device 11 is an onboard communication device and the information processing device 12 is a navigation device or an automatic driving control device that is mounted in the vehicle 10. However, some or all processing operations which are performed by the communication device 11 and the information processing device 12 may be performed by an arbitrary electronic device such as a smartphone or a computer.

For example, some processing operations which are performed by the vehicle 10 in the above-mentioned embodiment may be performed by the server 30, or some processing operations which are performed by the server 30 may be performed by the vehicle 10. Specifically, processing operations such as determination of whether a condition based on position information or travel route information of the vehicle 10 and a receiving place is satisfied, determination of whether there is a commodity that is common to the first list and the second list, and determination of whether a desired selling price is equal to or lower than a desired purchase price may be performed by the information processing device 12.

In the above-mentioned embodiment, the first list and the second list include identification information and prices of commodities. However, the first list and the second list may further include arbitrary information on commodities. For example, each of the first list and the second list may further include information indicating commodity statuses (for example, "a new article" or "a secondhand article"). In this case, the server control unit 33 transmits transaction information of commodities which are common to the first list and the second list, in which a desired selling price is equal to or lower than a desired purchase price, and in which a commodity status matches between the first list and the second list to the information processing device 12. With this configuration, since a transaction can be carried out in consideration of more detailed conditions on commodities, it is possible to improve convenience of the information processing system 1.

In the above-mentioned embodiment, it is determined whether a desired selling price of each commodity common to the first list and the second list is equal to or lower than a desired purchase price. Here, when there are a plurality of commodities that are common to the first list and the second list, it may be determined whether the sum of desired selling prices of two or more common commodities is equal to or lower than the sum of desired purchase prices. For example, in the examples illustrated in FIGS. 5 and 6, there are two commodities "clothing A" and "book C" which are common to the first list and the second list. In this case, the server control unit 33 determines that the sum "1000+7280=8280" of the desired selling prices of the two commodities "clothing A" and "book C" is equal to or lower than the sum "4000+5000=9000" of the desired purchase prices and transmits transaction information of the two commodities "clothing A" and "book C" to the information processing device 12 via the server communication unit 31. With this configuration, the first user can sell the two commodities "clothing A" and "book C" to the second user together. Accordingly, it is possible to further improve convenience of the information processing system 1.

In the above-mentioned embodiment, when there are a plurality of second users who want to purchase a commodity, a plurality of pieces of transaction information for the second users can be transmitted from the server 30 to the information processing device 12 and be notified to the first user. In this case, for example, notification of the plurality of pieces of transaction information to the first user may be restricted such that driver distraction is not caused. For example, the control unit 126 of the information processing device 12 may restrict the number of pieces of transaction information which are notified to the first user within a predetermined period. Alternatively, the server control unit 33 of the server 30 may restrict the number of pieces of transaction information which are transmitted to the information processing device 12 within a predetermined period. For example, the control unit 126 of the information processing device 12 may notify the first user of only one piece of transaction information in which a distance or a temporal distance from the position or the travel route of the vehicle 10 to the receiving place is the minimum among a plurality of pieces of transaction information received from the server 30. Alternatively, the server control unit 33 of the server 30 may transmit only one piece of transaction information in which a distance or a temporal distance from the position or the travel route of the vehicle 10 to the receiving place is a minimum among the plurality of pieces of transaction information to the information processing device 12. With this configuration, since the number of pieces of transaction information which are notified to the first user is reduced, it is possible to reduce a likelihood that driver distraction will be caused.

For example, a general-purpose electronic device such as a smartphone or a computer may serve as the communication device 11, the information processing device 12, or the server 30 in the above-mentioned embodiment. Specifically, a program in which process details for realizing the functions of the communication device 11 or the like in the embodiment are described is stored in a memory of an electronic device and the program is read and executed by a processor of the electronic device. Accordingly, the disclosure can also be embodied as a program which can be executed by a processor, or a storage medium storing a program.

What is claimed is:

1. An information processing system, comprising:
    an information processing device configured to be used by a first user; and
    a server comprising a storage and being configured to communicate with the information processing device, the server being programmed to:
        access a first list including commodities which are sold by the first user who uses a vehicle and desired selling prices of the commodities which are sold by the first user, a second list including commodities which a second user wants to purchase and desired purchase prices of the commodities which the second user wants to purchase, and position information of a receiving place of the commodities, the first list, the second list, and the position information being stored in the storage;
        receive information indicating that the vehicle is moving, and subsequently determine whether the vehicle satisfies a predetermined condition, based on position information or travel route information of the vehicle and the position information of the receiving place;
        determine (i) that there are at least two commodities that are common to the first list and the second list when it is determined that the predetermined condition is satisfied, and (ii) whether a sum of the desired selling prices of the at least two commodities is equal to or lower than a sum of the desired purchase prices for the at least two commodities; and
        transmit transaction information indicating the at least two commodities which are common to the first list and the second list and position information of the receiving place, to the information processing device, when the predetermined condition is satisfied and at least two commodities that are common are present;
    wherein the information processing device is configured to notify the first user of the transaction information when the predetermined condition is satisfied and the at least two commodities that are common are present.

2. The information processing system according to claim 1, wherein the information processing device is a navigation device installed in the vehicle.

3. The information processing system according to claim 1, wherein the information processing device is an automatic driving control device installed in the vehicle.

4. The information processing system according to claim 1, wherein:
    the storage also stores the position information or the travel route information of the vehicle which is moving.

5. The information processing system according to claim 1, wherein the information processing device is configured to execute driving support with the receiving place as a destination in response to a predetermined user input after notifying the first user of the transaction information.

6. The information processing system according to claim 1, wherein:
    the first list further includes commodity statuses indicating whether each commodity which is sold by the first user is a new article or a secondhand article; and
    the second list further includes commodity statuses indicating whether each commodity which the second user wants to purchase is a new article or a secondhand article.

7. The information processing system according to claim 1, wherein the predetermined condition includes a first condition that a distance or a temporal distance from a position or a travel route of the vehicle to the receiving place is less than a reference value.

8. The information processing system according to claim 7, wherein:
    the storage stores a time period in which receiving is possible in the receiving place;
    the predetermined condition is calculated based on the position information or the travel route information of the vehicle and the position information of the receiving place; and
    the predetermined condition further includes a second condition that a predicted time at which the vehicle arrives at the receiving place is included in the time period in which receiving is possible.

9. A non-transitory computer-readable storage medium storing a program that causes a computer to execute processes, the processes comprising:
    storing a first list including commodities which are sold by a first user who uses a vehicle and desired selling prices of the commodities which are sold by the first user, a second list including commodities which a second user wants to purchase and desired purchase prices of the commodities which the second user wants to purchase, and position information of a receiving place of the commodities;
    receiving information indicating that the vehicle is moving, and subsequently determining that the vehicle satisfies a predetermined condition, based on position information or travel route information of the vehicle and the position information of the receiving place;
    determining (i) that there are at least two commodities that are common to the first list and the second list when it is determined that the predetermined condition is satisfied, and (ii) that a sum of the desired selling prices of the at least two commodities is equal to or lower than a sum of the desired purchase prices for the at least two commodities;
    transmitting transaction information indicating the at least two commodities which are common to the first list and the second list and position information of the receiving place, to an information processing device, when the predetermined condition is satisfied and the at least two commodities that are common are present; and
    notifying the first user of the transaction information when the predetermined condition is satisfied and the at least two commodities that are common are present.

10. A control method for a computer, the control method comprising:
    storing a first list including commodities which are sold by a first user who uses a vehicle and desired selling prices of the commodities which are sold by the first user, a second list including commodities which a second user wants to purchase and desired purchase prices of the commodities which the second user wants to purchase, and position information of a receiving place of the commodities;

receiving information indicating that the vehicle is moving, and subsequently determining that the vehicle satisfies a predetermined condition, based on position information or travel route information of the vehicle and the position information of the receiving place;

determining (i) that there are at least two commodities that are is common to the first list and the second list when it is determined that the predetermined condition is satisfied, and (ii) that a sum of the desired selling prices of the at least two commodities is equal to or lower than a sum of the desired purchase prices for the at least two commodities; and transmitting transaction information indicating the at least two commodities which are common to the first list and the second list and position information of the receiving place, to an information processing device, when the predetermined condition is satisfied and the at least two commodities that are common are present;

wherein the transmitting includes notifying the first user of the transaction information when the predetermined condition is satisfied and the at least two commodities that are common are present.

11. An information processing system, comprising:

an information processing device configured to be used by a first user; and a server comprising a storage and being configured to communicate with the information processing device, the server being programmed to:

access a first list of commodities which are sold by the first user who uses a vehicle, a second list of commodities which second users want to purchase, and position information of a receiving place of the commodities, the first list, the second list, and the position information being stored in the storage;

receive information indicating that the vehicle is moving, and subsequently determine whether the vehicle satisfies a predetermined condition, based on position information or travel route information of the vehicle and the position information of the receiving place;

determine that there are a plurality of commodities that are common to the first list and the second list that second users want to purchase when it is determined that the predetermined condition is satisfied; and transmit a plurality of pieces of transaction information indicating the plurality of commodities for the second users which are common to the first list and the second list and position information of the receiving place for each piece of transaction information, to the information processing device, wherein the information processing device is configured to notify the first user of only one piece of transaction information from among the plurality of pieces of transaction information, the one piece of transaction information having a distance or a temporal distance from the position or the travel route of the vehicle to the receiving place that is a minimum among a plurality of pieces of transaction information received from the server.

* * * * *